Feb. 14, 1928.

J. A. DOANE 1,659,247

FULL AUTOMATIC THREAD HOBBING MACHINE

Filed July 19, 1923      6 Sheets-Sheet 2

*Fig. 2*

INVENTOR
J. A. Doane

BY Joseph N. Schofield
ATTORNEY

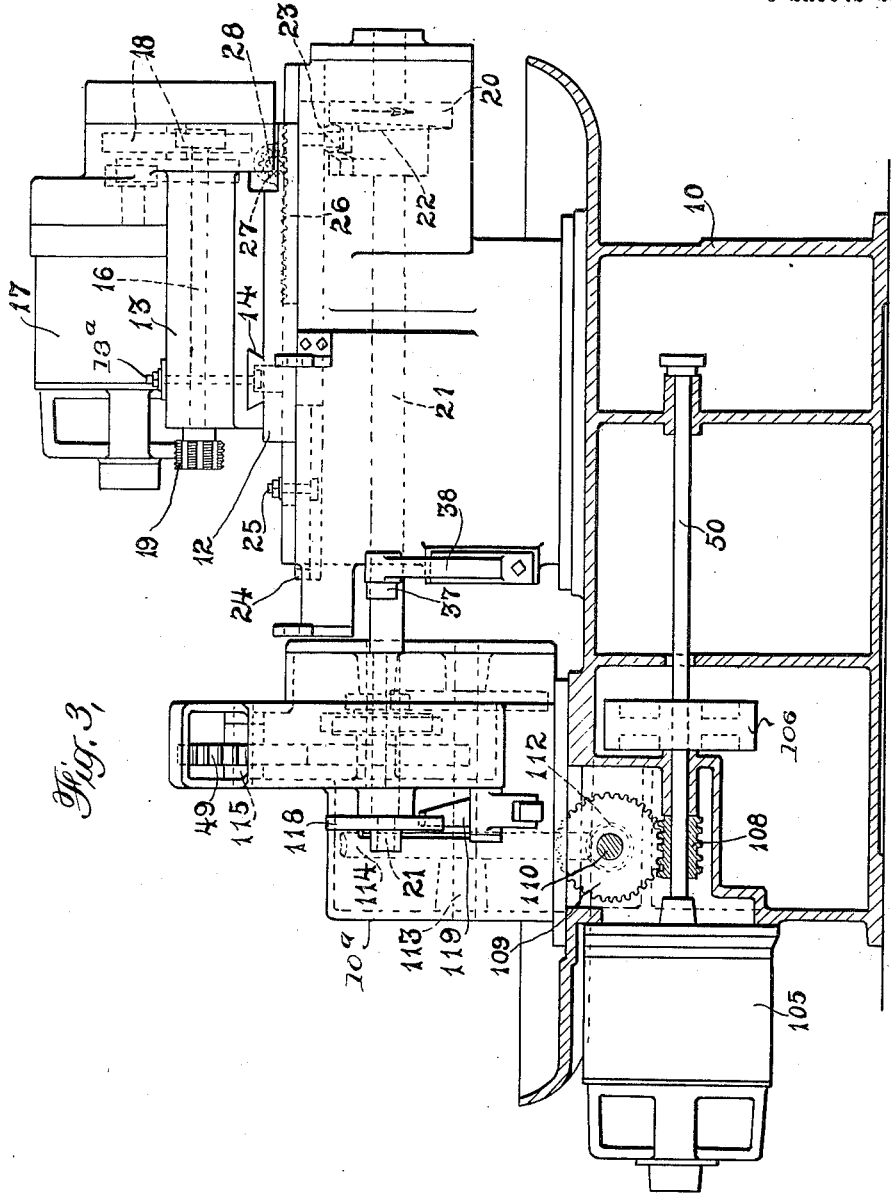

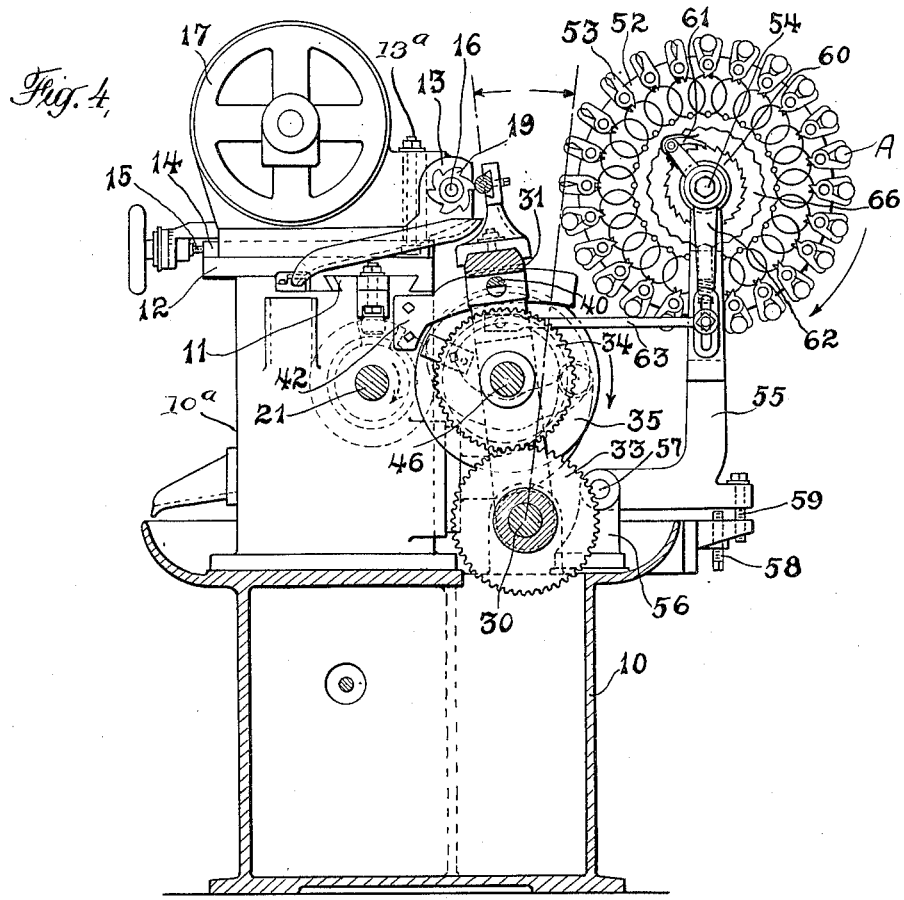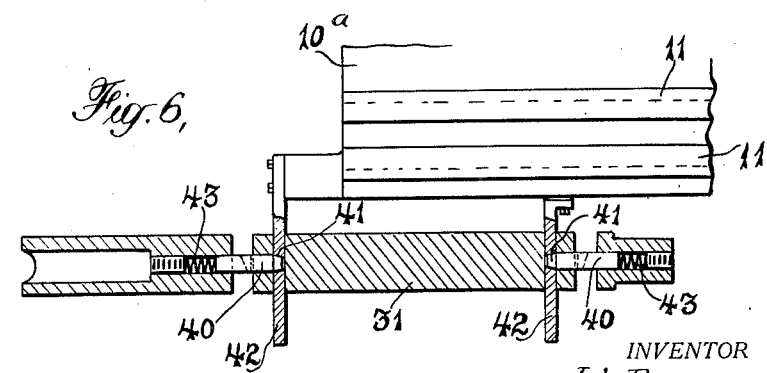

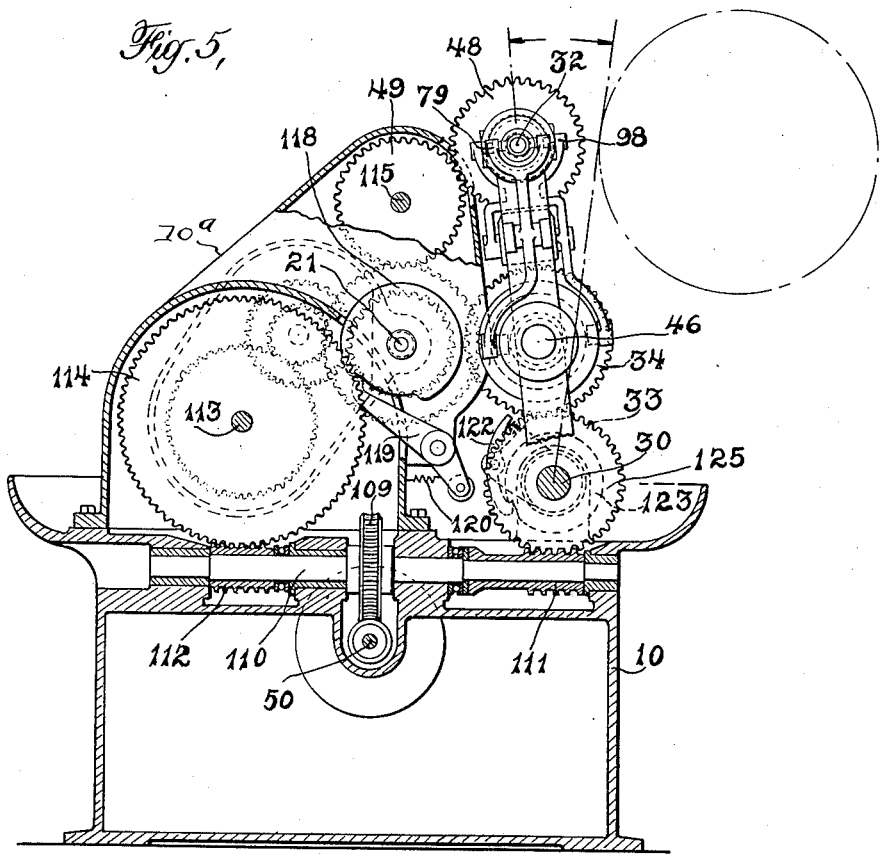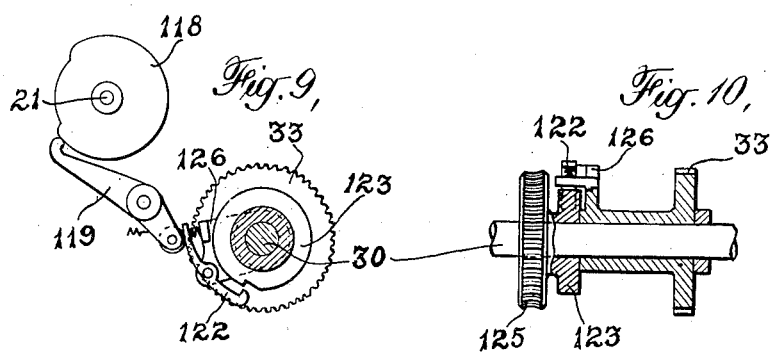

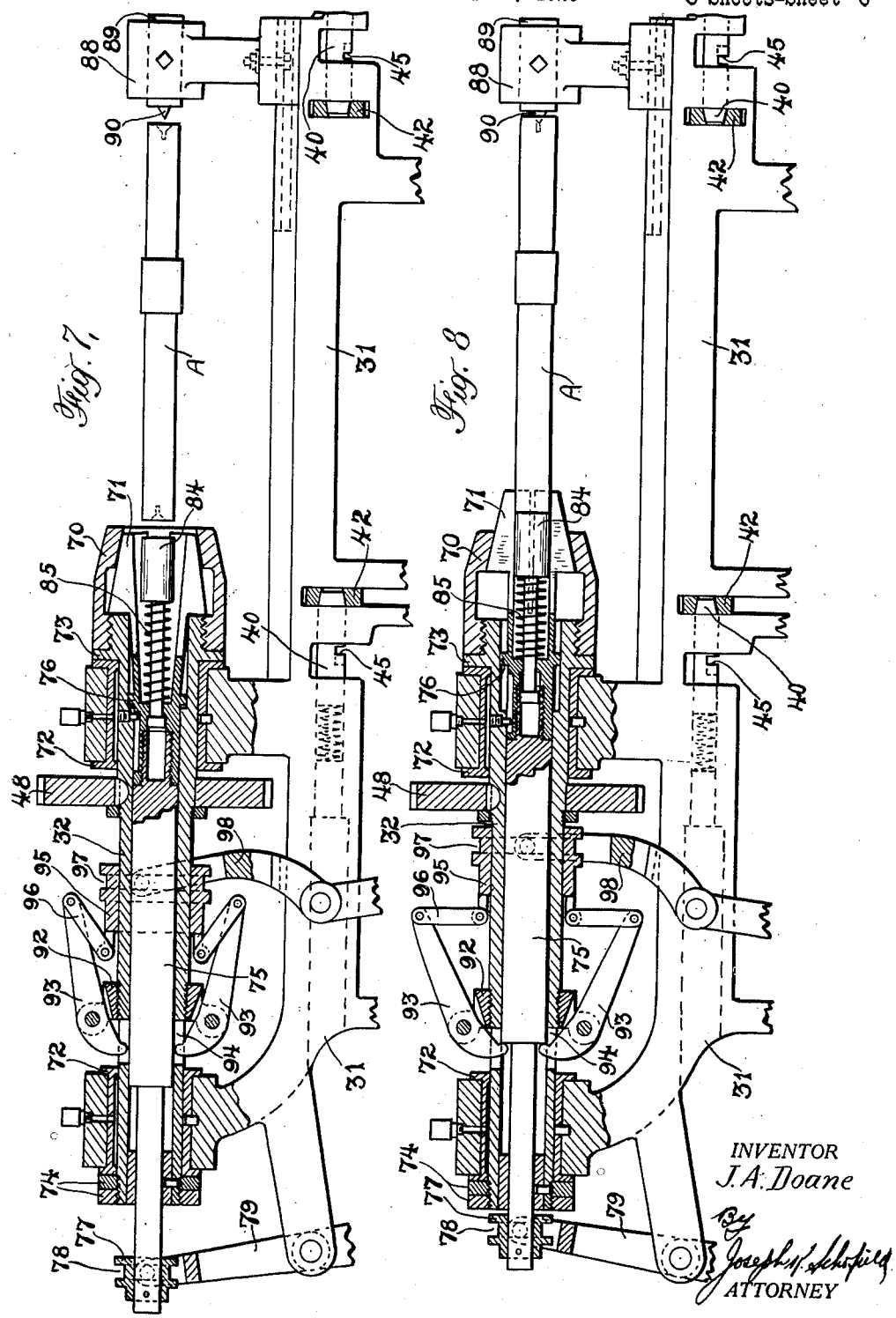

Patented Feb. 14, 1928.

1,659,247

UNITED STATES PATENT OFFICE.

JOHN A. DOANE, OF HARTFORD, CONNECTICUT, ASSIGNOR TO PRATT & WHITNEY COMPANY, OF NEW YORK, N. Y., A CORPORATION OF NEW JERSEY.

FULL AUTOMATIC THREAD-HOBBING MACHINE.

Application filed July 19, 1923. Serial No. 652,579.

This invention relates to metal cutting machines and particularly to a hobbing or milling machine for forming screw threads.

A principal object of the present invention is to provide a hobbing or milling machine adapted to automatically operate upon a wide range of articles to form outside screw threads or any other contour thereon which may be formed by a properly shaped milling cutter.

Another object of the invention is to provide means for automatically loading articles to be hobbed or milled upon a work spindle and then to move the work spindle with the work thereon into operative position to engage the work while on the spindle with the milling cutter or hob.

Another object of the invention is to provide an improved construction of work supporting and rotating spindle adapted to first engage an article while it is in a magazine, and clamp one end in position within the work spindle after moving the opposite end of the article against a tailstock adjustably mounted relative to the work spindle.

Another object of the invention is to mount the work spindle and its attached parts upon an oscillatory frame and provide means to periodically oscillate this frame between two positions, one position adapting the work spindle to engage an article in a magazine and advance it against the tailstock and the other position adapted to locate the work in operative relation with the cutter.

Another object of the invention is to provide means to rotate the work spindle positively at a predetermined speed relative to axial movements given the cutter and its attached parts while the work is in operative or cutting position, and to disengage the driving connections for the spindle and release the blank from the chuck when the work is out of operative position.

Another object of the invention is to provide an improved driving mechanism for the rotatable milling cutter comprising an electric motor directly mounted upon and movable with the cutter head or slide and including driving connections extending from the motor to the cutter spindle.

With these and other objects in view, my invention consists in the features of construction and operation set forth in the following specification and illustrated in the accompanying drawings.

In the accompanying drawings annexed hereto and forming a part of this specification, I have shown my invention embodied in a screw thread hobbing machine of relatively small size, but it will be understood that the invention, or parts thereof, can be otherwise embodied and that the drawings are not to be construed as defining or limiting the scope of the invention, the claims appended to this specification being relied upon for that purpose.

In the drawings:

Fig. 2 is a plan view thereof.

Fig. 3 is a longitudinal view in elevation, parts being broken away to more clearly show the cutter controlling and rotating mechanisms and the rotating means for the work spindle.

Fig. 4 is a transverse view in elevation taken substantially on line 4—4 of Fig. 1.

Fig. 5 is a transverse view in elevation taken substantially on line 5—5 of Fig. 1.

Fig. 6 is a fragmentary plan view taken on line 6—6 of Fig. 1.

Figs. 7 and 8 are longitudinal sectional views through the work spindle showing its parts in different operative positions.

Fig. 9 is a transverse view of a detail forming part of the driving mechanism, and Fig. 10 is a longitudinal sectional view of the same.

Figure 1:
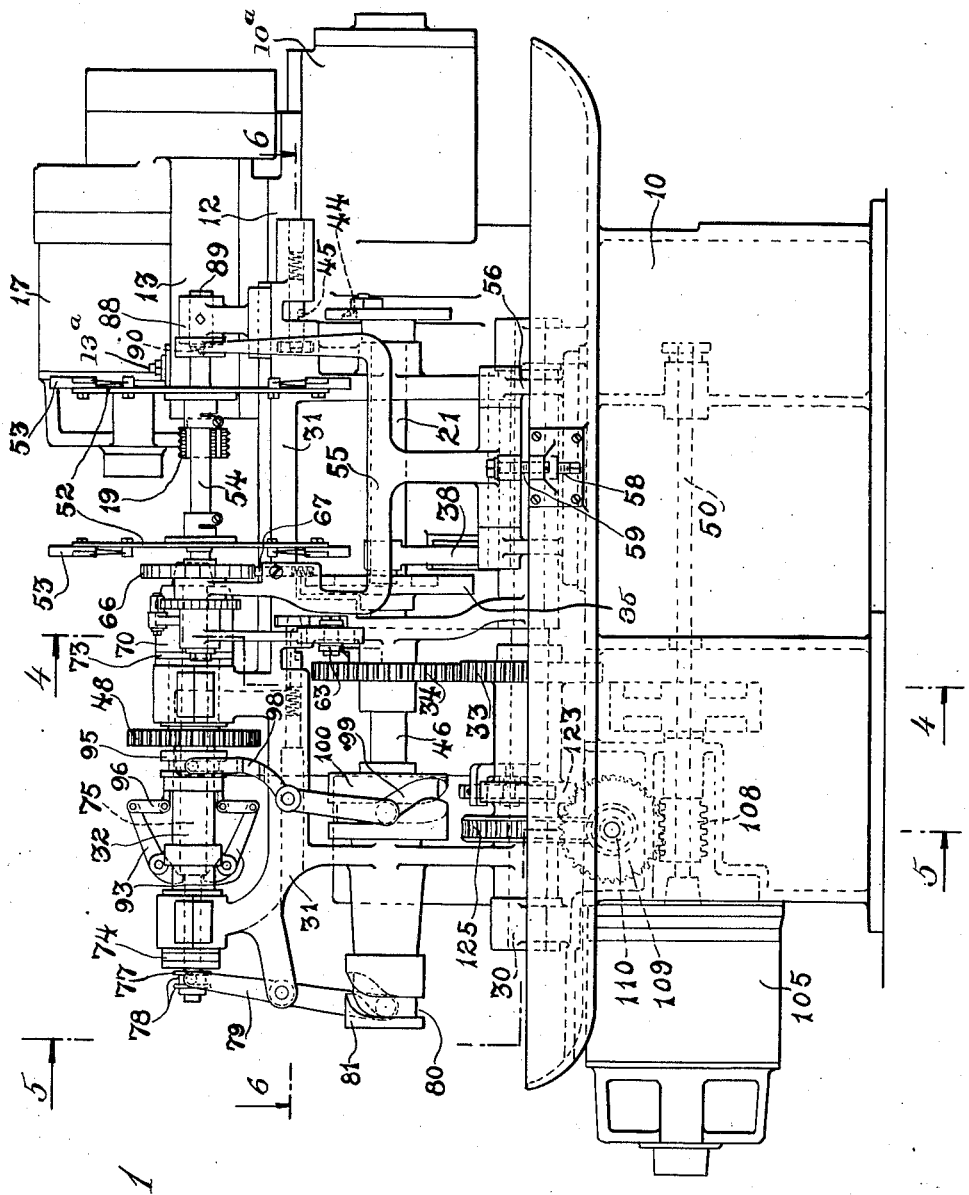
Figure 1 is a front elevation of the complete machine.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: first, a base; second, a cutter carriage movable longitudinally on the base; third, a cutter spindle and driving means therefor; fourth, an oscillating frame carrying at its free end a rotatably mounted work supporting spindle; fifth, means to positively rotate the work spindle when the frame is in one of its oscillated positions; sixth, means to lock the frame in its operative or work spindle rotating position; seventh, a blank holding mechanism or magazine mounted adjacent the oscillating frame; and eighth, means for controlling the longitudinal position of the cutter and cutter head in timed relation to the rotation of the work spindle.

Referring more in detail to the figures of the drawings I provide a base 10 on which may be secured the frame 10ª having longitudinally extending ways 11 upon its upper horizontal surface. Adapted to slide along these ways is a tool carriage 12 having a tool head or slide 13 mounted thereon. This tool or cutter head 13 is preferably mounted upon transverse ways 14 formed on the upper surface of the carriage 12 so that the head 13 may be adjusted transversely thereof by rotation of a screw 15. Upon the cutter head or slide 13 is mounted a cutter spindle 16 preferably extending exactly longitudinally of the base, and which may be driven from an electric motor 17, also mounted directly on the head or slide 13, through appropriate driving connections 18. A clamping bolt 13ª passing through the carriage and head is provided to securely fasten the cutter slide 13 in its transverse adjusted position upon the longiudinally movable carriage 12. On the cutter spindle 16 at one end is mounted the rotatable cutter or hob 19. The driving connections 18 for the cutter spindle 16 from the motor 17 have members which are adapted to be readily removed permitting others of different size to be substituted to rotate the cutter spindle 16 at different speeds to accommodate the particular cutter being used.

In order to control the longitudinal position of the cutter carriage 12 on the ways 11, a face cam 20 is mounted within the frame 10ª upon a suitable shaft 21. The means for rotating this shaft at a relatively slow speed will presently be described. This cam 20 is provided with a helicoidal surface 22 adapted to contact with a roller 23 fastened to and depending from a bar 24 slidably mounted in a longitudinal recess within the frame 10ª. The rod or bar 24, by means of a clamping bolt 25, may be adjustably secured to the cutter carriage 12. A rack 26 fastened in any suitable manner to the frame 10ª is in mesh with a pinion 27 mounted upon a transverse shaft 28 within the cutter carriage 12. Rotation of this pinion 27 manually as by a wrench placed on the squared end of the shaft 28 may be used to adjustably position the carriage 12 relative to and longitudinally of the base 10. This adjusting means therefore may be used to position the carriage 12 for the particular work being operated on, and, with this adjustment effected and with the carriage 12 clamped to the bar 24, it will be given the necessary thread forming movement by means of the cam 20 engaging the roller 23 on the bar 24.

For operating on work not having threaded surfaces, the cam 20 and parts operated thereby may be disconnected and the cutter carriage 12 clamped directly to the frame 10ª by any suitable fastening means not shown.

Mounted to oscillate upon a longitudinally extending shaft 30 suitably supported within the base 10 is a freely swinging frame 31. This frame 31 at its upper or free end, is provided with a rotatable work spindle 32 which presently will be further described. The shaft 30 upon which this frame is oscillated is provided with a driving gear 33 driven through suitable connections from a motor and which, by means of gear 34, drives a suitable face cam 35 mounted on a main cam shaft 46 and having a cam groove of the form shown in Fig. 4 in dotted outline. By rotation therefore of the drive shaft 30 and the cam 35, the frame 31 may be given its oscillatory movements at predetermined times in its cycle of operation. Preferably the cam surface of the cam 35 for oscillating the frame 31 is in engagement with a roller 37 mounted on the free end of a bracket 38 fixed to and outstanding from the base 10.

While the frame 31 is oscillated to its position for engagement of the work A with the cutter 19, it is necessary for it to be securely held or locked in that position. I therefore provide locking bolts 40 on the frame 31 for that purpose adapted to engage within recesses 41 formed in suitable brackets 42 fixed to the frame 10ª. These bolts 40 are mounted so that they are axially movable within the oscillating frame 31. The brackets 42 outstanding from the front vertical surface of the frame 10ª are provided with holes of conical from forming the recesses 41 into which the frame locking bolts 40 are adapted to enter. Normally the bolts 40 are resiliently forced toward their locked position by means of suitably placed coiled springs 43. Cams 44 adapted to engage the end walls of recesses or notches 45 formed in the sides of the bolts 40 are mounted on the main cam shaft 46 and are adapted to withdraw the bolts 40 from their recesses at the proper time during the cycle of operations. With the bolts 40 in their retracted position, oscillation of the frame 31 toward the blank carrying magazine is permitted. As shown, the cams 44 are mounted on the periphery of disks secured on the shaft 46 and rotate simultaneously with the cam 35 for oscillating the frame 31.

The work supporting and rotating spindle 32 mounted at the free end of the frame 31 is adapted to be positively rotated at slow speed when the frame is in position to engage the work with the cutter. For this purpose a spur gear 48 is mounted on the work spindle 32 adapted, when the frame 31 is oscillated to operative or cutting position, to mesh with a gear 49 continuously driven at a constant slow speed from a main driving shaft 50. Movement of the frame 31 away from operative position disengages the gear 48 on the work spindle 32 from its driving gear 49. The means for rotating the driving gear 49 from shaft 50 will be described in another portion of the specification.

In the forward oscillated position of the frame 31, the work spindle 32 and its chuck are moved to a position adapting them to engage and retain an article or blank A to be operated on. These blanks or articles A are held in a magazine, adjustable for articles of different sizes and types, which is preferably mounted upon and in front of the frame 10ᵃ. This magazine or blank holding mechanism as shown is preferably of circular form and comprises a pair of disks 52 adjustably spaced apart and provided with suitable blank retaining means 53. The disks 52 may be rotated in a step-by-step manner to successively advance the articles A to a position so that they may be individually engaged upon the work spindle 32. These disks 52 are adapted to be adjustably positioned and clamped to the shaft 54.

The magazine, that is, the disks 52 and shaft 54, is mounted on a frame 55 adjustably secured to the forward part of the base 10 by means of the bracket 56. As shown in Figs. 1 and 4, this frame 55 may be mounted upon a fixed shaft 57 extending parallelly with the work spindle 32 and secured within the bracket 56 so that it may be tilted about shaft 57 toward or from the work spindle 32. Adjusting screws 58 and 59 are shown in Figs. 1 and 4 providing means for conveniently adjusting and securing the magazine frame in any adjusted position.

The rotatably mounted shaft 54 of the magazine extends in a direction parallel to the axis of the work spindle 32, and is provided with two disks or spiders 52, one or both being adjustable for articles of different length longitudinally of the shaft 54. Each of these disks is provided with a plurality of article retaining members in the form of jaws permitting the articles to be held resiliently in position to be engaged by the work spindle 32 and released therefrom by separation of the jaw members by movement of the oscillating frame 31 away from the magazine. As the article engaging portions of the jaws 53 extend beyond the periphery of the disks 52, the articles individually retained by them may be readily engaged by the work spindle 32 and released from the magazine directly by the oscillatory movement of the work spindle carrying frame 31. Also these jaws 53 are conveniently located for loading the articles onto them manually so that a number of articles A can be loaded at one time.

With each cycle of operations the disks 52 must be rotated sufficiently to advance one of the articles A to its loading position. For this purpose I make use of the oscillatory movement of the spindle carrying frame 31. The shaft 54 is provided with a ratchet wheel 60 secured thereto and having a number of teeth thereon equal to the number of the article holding members 53 on the spiders 52 of the magazine. This ratchet wheel 60 is engaged by a pawl 61 formed on an arm of a member 62 freely rotatably mounted on shaft 54. Another arm on this member 62 is adjustably connected to a reach arm 63 the opposite end of which is attached to the oscillating frame 31. From this construction, it will be seen that with each oscillatory movement of the frame 31, the oscillation of member 62 will cause the pawl 61 to engage the ratchet wheel 60 and the magazine will be rotated through an angle sufficient to advance another blank A into position to be engaged by the work spindle 32. Also on the magazine carrying shaft 54 is a member 66 having depressions adapted to be engaged by a spring pressed detent 67. With rotative movement of the disks 52, the detent 67 is forced from one of the depressions to an adjacent one so that the magazine is prevented from accidentally turning.

The work spindle 32 and its attached parts are of special form and operate in a novel manner. It is not only necessary to support and rotate the blanks being operated on but it is also essential in the embodiment of the invention illustrated that the work holding members comprising a chuck on one end of the work spindle 32 be moved axially when in position to engage one of the articles in the magazine. The spindle 32 at one end is provided with a chuck member 70 preferably having resilient jaws 71 adapted to engage and clamp the article. Suitable bearings 72 provided on the oscillating frame 31 permit rotation of the spindle 32 about an axis exactly longitudinally of the machine. An integral collar 73 or flange prevents axial movement in one direction. Adjustable collars 74 on the spindle 32 at the opposite end prevent axial movement in the opposite direction. Extending axially within the spindle 32 is a chuck actuating rod 75. This rod 75 at its forward end has secured to it a member 76 on which the resilient chuck jaws 71 are mounted. These jaws 71 are adapted in their forward position to engage the internal conical surface of the chuck member 70 which is conveniently and fixedly attached to the spindle 32. The jaws 71 in their advanced position therefore are strongly urged toward each other by the member 70 into their work engaging and clamping position.

The chuck actuating rod 75 is provided with a collar 77 near its rear end having a circumferential groove 78. This groove 78 is engaged by the forked end of a lever 79 suitably pivoted to a part of the oscillating frame 31. The lower end of this lever 79 is adapted to engage a cam groove 80 provided on a cam member 81 on the main cam shaft 46 mounted on the frame 31. This cam groove 80 is so designed and positioned that when the oscillating frame 31 is oscillated to its position to engage one of the blanks A in the magazine, the chuck actuating rod 75 will be moved from its rearward position to its advanced or forward position thus forcing the resilient jaws 71 axially and simultaneously toward each other to firmly grip the blank A.

As will be seen in Figs. 7 and 8, there is a plunger 84 mounted for axial movement within the space between the resilient jaws 71. This plunger 84 is urged towards its advanced position by a coiled spring 85. With the jaws 71 in their retracted or open position, the actuating rod 75 advances the jaws 71 axially to surround the article A to be operated upon. This movement of the jaws 71 first engages the work blank A with the advanced end of the plunger 84 while the blank A is still retained within the magazine. Further axial movement of the chuck jaws 71 and the rod 75 will force the article or blanks A axially against a tailstock 88. As soon as the blank is in fixed position against the tailstock 88, further movement of the chuck jaws 71 will force the plunger 84 to the left relative to the chuck jaws thus compressing its actuating spring 85 and causing the jaws 71 to tightly engage the blank. The tailstock 88 as shown is adjustably mounted upon suitable ways on the oscillating frame 31 so that it may be positioned at any desired distance from the chuck jaws 71 and be securely clamped in fixed position. This tailstock 88 carries a small spindle 89 slidably secured therein and having a center 90 extending from one end. This center 90 is adapted to engage the countersunk center hole in the blank being operated on when it is forced by the plunger 84 against the tailstock 88.

In addition to the above described means for supporting and rotating the article, a special clamping means is provided by means of which the chuck jaws 71 are forced toward their advanced position to very tightly engage the blank being operated on. For this purpose, I mount a sleeve 92 upon the work spindle 32 preferably threading it thereon as shown in the Figs. 7 and 8. This sleeve 92 carries oscillating levers 93 oppositely disposed, one end of each being adapted to contact with a shoulder formed on the chuck actuating rod 75. Suitable recesses 94 are formed in the spindle 32 so that these lever arms 93 may engage the rod 75. The opposite ends of the levers 93 are connected to an axially movable sleeve 95 by means of suitable links 96. This sleeve 95 is provided with a peripheral groove 97 engaged by the forked end of a second cam actuated lever 98, the opposite end of which has a roller thereon in engagement with a cam groove 99 of a cam member 100 on the main cam shaft 46. The position and shape of this cam groove 99 is such that as soon as the jaw actuating rod 75 and the jaws 71 are moved axially to engage the blank and are approximately in their final position, it will move the sleeve 95 axially to move the oscillating levers 93 from the position shown in Fig. 7 to that shown in Fig. 8, thus still further urging the resilient chuck jaws 71 into their final and clamped position against the blank.

The above comprises a description of the detailed mechanisms made use of in the present invention. The operations of these above described mechanisms are all controlled in timed relation to each other. The means for controlling these mechanisms will now be described.

As shown in Fig. 3, there is a main driving shaft 50 mounted longitudinally within the base 10. This may be driven by any preferred means such as by a motor 105 shown in direct engagement therewith. This main driving shaft also, may have a fly wheel 106 fastened to it to cause smoother operation of the machine. On this main driving shaft 50 is a main driving worm 108 engaging a worm wheel 109 on a transverse shaft 110. This transverse shaft 110 on either side of the worm wheel 109 and near its forward and rearward ends as shown in Fig. 5 has two worms 111 and 112 for positively driving the mechanism of the machine. The worm 112 toward the rear of the machine drives a longitudinal shaft 113 through a worm wheel 114. This shaft 113, through suitable gearing, drives the spur gear 49 on a shaft 115 extending longitudinally of the machine. This gear 49, as above mentioned, forms the driving gear for the work spindle 32 when in its operative position. With the work spindle 32 in its rear or operative position, it is in driving relation with the gear 49 above mentioned and is disengaged therefrom by the forward oscillatory movement of the frame 31. The driving gear 49 for the work spindle 32 is positively rotated continuously and at a very low speed through the intermediate gearing shown most clearly in Fig. 5.

On one of the intermediate shafts for the work spindle driving gear 49 is the lead cam shaft 21 previously referred to and which is provided with a cam member 118 of the shape most clearly shown in Fig. 9. A lever 119 pivoted to the machine frame 10ᵃ engages the periphery of this cam member 118 so that it may be oscillated from one position to another by engagement with the different portions of its periphery. A spring 120 serves to hold the lever 119 with one end toward the periphery of the cam. This cam 118 is rotated at a speed somewhat slower than the driving gear 49 for the work spindle by reason of the speed ratio between the shafts 21 and 115. This cam 118, the lead cam 20 and its shaft 21 in the embodiment of the invention shown and described make approximately one revolution while the work driving gear and the work spindle make one and a fifth revolutions. One rotation of the shaft 21 and the cam 118 occurs during one complete cycle of operation of the machine.

During the portion of the rotation of this shaft 21 that the work spindle 32 is in operative position and while the work A rotates through exactly one turn, the cam 20 advances the cutter 19 axially relatively to the blank a distance equal to the lead of the thread being formed. During the remainder of the rotation of this cam shaft 21, the work spindle carrying frame 31 is being oscillated to load a new work blank on the spindle 32 and the cutter carriage 12 is being returned to its initial position.

As shown in Fig. 9, the cam 118 holds the lever 119 to its position away from the cam axis during about three fourths of its rotation, and, during the remainder of its rotation, permits it to oscillate to its opposite position. When the lever 119 engages the portions of the cam of greater radius the lever 119 is in position to contact with one end of a pawl 122 and disengage it from a notch formed in the wheel 123. The function of these parts will presently be described.

The other driving worm 111 on the transverse shaft 110 positioned toward the forward portion of the machine is in driving relation with a worm wheel 125 on shaft 30 coaxial with the axis upon which the work spindle frame 31 oscillates. This worm wheel 125 is constantly rotated and rotated with it is the one toothed ratchet wheel 123 which is shown in Fig. 10 and which is preferably formed integrally with the worm wheel 125 as shown in Fig. 10. Adjacent this worm wheel 125 and ratchet wheel 123 is a member 126 having pawl 122 normally spring pressed to engage the ratchet wheel 123. This member 126 also carries the spur gear 33, previously mentioned, preferably formed directly on the member 126. With the pawl 122 in the position shown in Fig. 5, that is, in its engaged position, the worm wheel 125 drives the member 126 on which the pawl 122 is mounted, and also spur gear 33; but, as soon as a portion of the pawl 122 is directly adjacent the cam operated lever 119, it is moved to its outer position thus permitting the worm wheel 125 to rotate freely without corresponding movement of the ratchet wheel 123 and driving spur gear 33. So long therefore as the pawl 122 is in engaged position, rotation of the driving gear 33 takes place, but rotation of gear 33 stops as soon as the pawl 122 is withdrawn.

This spur gear 33 is in mesh with another spur gear 34 of the same number of teeth which is mounted on the cam shaft 46 extending longitudinally of the work spindle 32. On this latter shaft are mounted five cams, 81, 100, 35, and two indicated by the numeral 44, all of which have been referred to above. Two of these cams 44 are used to actuate the plungers 40 which serve to lock the frame 31 in its work engaging position, two cams 81 and 100 serve to actuate the chuck operating levers 79 and 98, and the cam 35 serves to oscillate the frame.

The gear 33 is therefore rotated through approximately one revolution during which time each of the above mentioned cams is actuated to perform its appropriate function.

From the above description it will be seen that mechanism has been disclosed for rotating work blanks while they are individually mounted on the work spindle 32. Also rotating means for a cutter 19 have been defined, the cutter 19 being advanced axially by a cam 20 having a helicoidal surface during the rotation of the work A timed to rotate with the cam. The result of these movements of the cutter 19 and of the work A is to form threads upon the outside surfaces of the blank or article being threaded of any desired diameter and lead. In addition automatically operating loading means are provided so that blanks may be engaged by the work spindle 32 after being manually placed in the magazine, and after being completely finished may be released and the spindle 32 moved by oscillation of its frame 31 to engage a new blank in the holding mechanism or magazine. It will be understood that by dispensing with the cam 20 and by locking the carriage to the frame or base 10, other forms of blanks besides screw threads may be generated. The cycle of operations for generating threads is adhered to in this specification as it necessitates operation of each of the mechanisms of the machine.

In forming threads upon blanks such as shown at A in the drawing, the cycle of operation of the mechanisms is as follows: When a blank has been completed and dropped the chuck formed by the jaws 71 remains open while the frame 31 is oscillated by cam 35 to its forward position. In this position of the frame, the spindle 32 is in alignment with one of the blanks A in the magazine 52, and, while in this position the jaws 71 are advanced by lever 79 actuated by cam 81 to close upon the blank and force it while still within the magazine against the tailstock center 90. Further rotation of cam 35 oscillates the frame 31 to its rearward or operative position, the blank A being carried therewith upon the spindle. This movement of the frame 31 also rotates the magazine 52 to position another blank for engagement by the spindle. Cams 44 on camshaft 46 then advance the plungers 40 to retain the frame 31 rigidly in operative position. At the completion of this movement of plungers 40, the rotation of cam shaft 46 is stopped by dis-engagement of the pawl 122.

As soon as the frame reaches its operative position, the spindle driving gear 48 and the spindle 32 are rotated by means of the constantly rotating gear 49. During this rotation the cutter 19, which has been engaged by oscillation of frame 31, is slowly advanced axially in timed relation to the spindle rotation by cam 20. When this cutting movement has been completed, the pawl 122 again engages the notch in the disk 123 thus again rotating the cam shaft 46. This second part of the rotation of cam shaft 46 first withdraws the plungers 40, then releases the chuck jaws 71 permitting the completed blank to drop and finally, oscillates the frame 31 to position the spindle 32 to engage another blank in the magazine.

What I claim is:

1. A metal cutting machine comprising in combination, a base, an oscillating frame thereon, a work spindle on said frame, work supporting and rotating means on said spindle, a cutter on said base, means to oscillate said frame to engage the work with said cutter, and axially movable cam operated locking bolts to lock the frame in position to engage the work with said cutter.

2. A metal cutting machine comprising in combination, a base, an oscillating frame thereon, a work spindle on said frame, work supporting and rotating means on said spindle, a cutter on said base, means to oscillate said frame to engage the work with said cutter, and cam operated locking means for locking said frame in position to engage the work with said cutter.

3. A metal cutting machine comprising in combination, a base, an oscillating frame thereon, a work supporting and rotating spindle on the frame, a cutter having annular series of teeth, a work blank holding mechanism mounted adjacent the base, means to oscillate said frame to a position adjacent said mechanism and to a position adjacent said cutter, means on said spindle to engage a blank in said holding mechanism, means to rotate said spindle more than one revolution while said frame is adjacent the cutter, and means to axially advance the cutter during the rotation of the spindle and in timed relation thereto.

4. A metal cutting machine comprising in combination, a base, a cutter thereon, an oscillating frame thereon, a work supporting and rotating spindle on the frame, a work blank holding mechanism mounted adjacent the base, means to oscillate said frame toward said mechanism, and axially movable chuck jaws carried by said spindle adapted to engage and clamp a work blank between them.

5. A metal cutting machine comprising in combination, a base, an oscillating frame thereon, a work supporting and rotating spindle on the frame, a cutter, a work blank holding mechanism mounted adjacent the base, means to oscillate said frame toward said mechanism, a tailstock on said frame, and axially movable chuck jaws on said spindle adapted to engage a work blank between them and move it into engagement with said tailstock.

6. A metal cutting machine comprising in combination, a base, an oscillating frame thereon, a work supporting and rotating spindle on the frame, a cutter, a work blank holding mechanism mounted adjacent the base, means to oscillate said frame toward said mechanism, a tailstock on said frame, and axially and radially movable chuck jaws on said spindle adapted to engage and clamp a blank between them and simultaneously move it into engagement with said tailstock.

7. A metal cutting machine comprising in combination, a base, an oscillating frame thereon, a work supporting and rotating spindle on the frame, a cutter, a work blank holding mechanism mounted adjacent the base, means to oscillate said frame toward said mechanism, a tailstock on said frame, radially movable chuck jaws on said spindle adapted to engage and clamp a blank between them and move it into engagement with said tailstock, and means to rotate said blank while in engagement with said spindle and tailstock.

8. A metal cutting machine comprising in combination, a base, an oscillating frame thereon, a work supporting and rotating spindle on the frame, an adjustably mounted cutter axially movable on said base, a work blank holding mechanism mounted adjacent the base, means to oscillate said frame toward said mechanism, a tailstock rotatable on said frame, radially movable chuck jaws on said spindle adapted to engage and clamp a blank between them and move it into engagement with said tailstock, and means to rotate said blank while in engagement with said spindle and tailstock.

9. A metal cutting machine comprising in combination, a base, an oscillating frame thereon, a work supporting and rotating spindle on the frame, a cutter, means to oscillate said frame into and out of operative position relative to said cutter, a tailstock on said frame, a chuck on said spindle adapted first to force said blank axially against said tailstock and then to clamp it in position on said spindle, and means to rotate said blank and spindle.

10. A metal cutting machine comprising in combination, a base, an oscillating frame thereon, a work supporting and rotating spindle on the frame, a cutter, means to axially move said cutter relative to the base, means to oscillate said frame into and out of operative position relative to said cutter, a tailstock on said frame, a chuck on said spindle adapted first to force said blank axially against said tailstock and then to clamp it in position on said spindle, and means to rotate said blank and spindle in timed relation to the axial movement of said cutter.

In testimony whereof, I hereto affix my signature.

JOHN A. DOANE.